United States Patent [19]

Okumura et al.

[11] 4,233,351
[45] Nov. 11, 1980

[54] CERAMIC HONEYCOMB STRUCTURE

[75] Inventors: Kazunari Okumura, Kariya; Shinichi Yamamoto, Takahama; Zituo Suzuki, Aichi, all of Japan

[73] Assignee: Nippon Soken, Inc., Nishio, Japan

[21] Appl. No.: 39,442

[22] Filed: May 15, 1979

[30] Foreign Application Priority Data

May 18, 1978 [JP] Japan .................................. 53-59589

[51] Int. Cl.² .............................................. B32B 3/12
[52] U.S. Cl. .................................. 428/116; 252/477 R; 428/188; 428/192
[58] Field of Search ................. 428/73, 116, 117, 118, 428/188, 192; 252/477 R

[56] References Cited

U.S. PATENT DOCUMENTS

| 3,251,403 | 5/1966 | Smith | 264/66 X |
| 3,887,741 | 6/1975 | Dwyer | 428/116 X |
| 3,899,326 | 8/1975 | Frost et al. | 428/116 X |
| 3,983,283 | 9/1976 | Bagley | 428/116 |
| 4,042,738 | 8/1977 | Gulati | 428/116 |
| 4,072,007 | 2/1978 | Sanday | 252/477 R X |

Primary Examiner—Henry F. Epstein
Attorney, Agent, or Firm—Cushman, Darby & Cushman

[57] ABSTRACT

A ceramic honeycomb structure is provided with a plurality of open passages extending therethrough in an axial direction thereof. The wall thickness of at least one part of the open passages formed in an annular portion along an outer peripheral surface of the structure is made larger than that of the other open passages formed in the other portion than the annular portion, and the structure has excellent mechanical strength and thermal shock strength.

6 Claims, 9 Drawing Figures

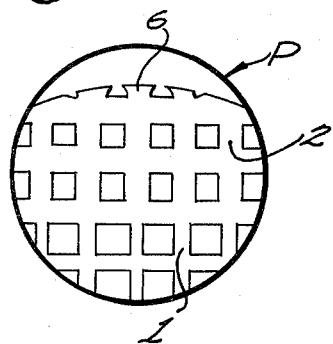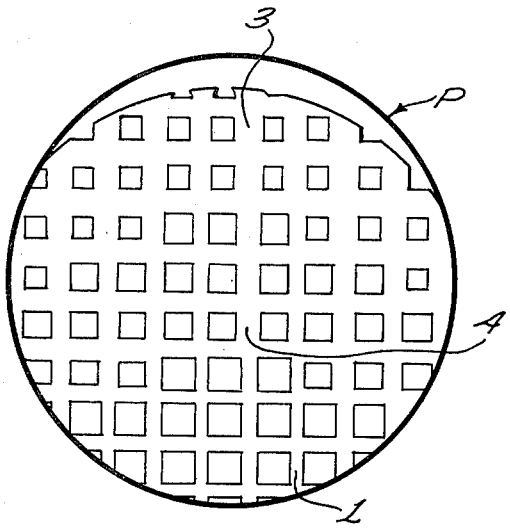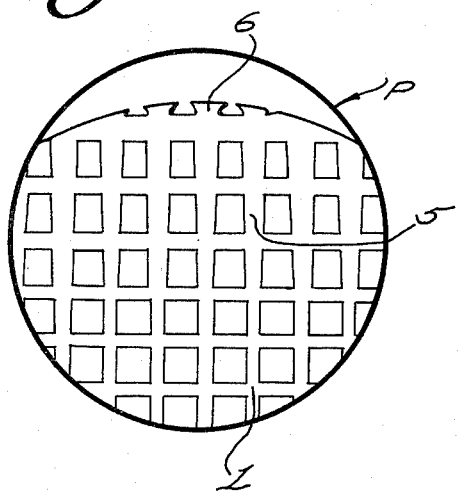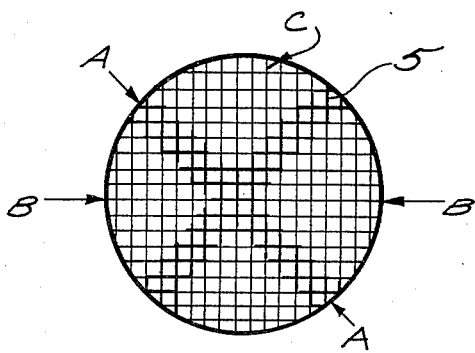

CERAMIC HONEYCOMB STRUCTURE

Japanese patent application No. 59589/1978, as to which priority is claimed, is hereby incorporated by reference.

The present invention relates to a ceramic honeycomb structure having a plurality of open passages extending therethrough for use in a catalyst carrier for purifying exhaust gases, such as a heat exchanger, and the like, and particulary relates to a thin-walled honeycomb structure.

It is an object of the present invention to provide such a honeycomb structure as described above which has an excellent mechanical strength and an excellent thermal shock strength.

Ceramic honeycomb structures which are formed by an extruding or injecting method have a plurality of passages extending therethrough. The typical unit cross section of the passages has a shape of a regular triangle, a regular square, a lozenge, a hexagon, or the like. Such structures have been found to have a directional quality in mechanical strength. For example, according to an experiment by the inventors upon a honeycomb structure C made of cordierite base ceramic having 300 open passages per square inch, of which the unit cross section was a regular square and wall thickness was 0.3 mm, the mechanical strength thereof in the direction of A was 8 kg/cm$^2$ and in the direction of B was 110 kg/cm$^2$ as shown in FIG. 1. Thus, such a honeycomb structure as described above has a clear directional quality.

Experiments were conducted as to the thermal shock strength of the ceramic honeycomb structure, by repeating a cycle of holding the honeycomb structure within an electric furnace at 800° C. for 30 minutes and then holding in air for one hour. The structure was completely cracked in its weak strength direction, namely the A—A direction (along a diagonal direction of a unit cross section) between the third and fifth repetition of the above cycle. Thus, the thermal shock strength of such a structure has a directional quality similar to that of the mechanical strength.

Such a directional quality of the mechanical strength and the thermal shock strength as described above appears in a triangular, lozenge-shaped or hexagonal unit cross section and the like. Also, similar directional qualities appear in a structure which has a cross section of square, circular or elliptical shape.

When an elliptical ceramic honeycomb structure c having a regular square unit cross section as shown in FIG. 2 is installed in an exhaust system of an automobile, or the like by attaching it within a case a through a cushion member b made of wire net as a catalyst carrier for purifying exhaust gases, stress is generated between the carrier c and the case a in corner portions d as enclosed by circles. This stress is due to heat and vibrations of the exhaust system of the automobile, or the like. Consequently, cracks frequently occur in the structure c, from the corner portions d in such directions as shown by lines e.

Conventionally, in order to overcome such drawbacks as described above, a method for forming a thick wall portion f having no open passages at all over the outer periphery of a cell portion 1 as shown in FIG. 3 has been adopted. According to this method, the mechanical strength of the whole ceramic honeycomb structure can be improved. However, since the thermal conductivity of the structure is different between the cell portion 1 and the thick wall portion f and particularly since the thermal condition becomes discontinuous in a boundary portion therebetween, cracks occur in the boundary portion when the structure is repeatedly cooled and heated for a long period as a catalyst carrier for an automobile.

Accordingly, an object of the present invention is to provide a ceramic honeycomb structure having an excellent mechanical strength and thermal shock strength.

Another object of the present invention is to provide an improved ceramic honeycomb structure for use in a catalyst carrier for purifying exhaust gases, or a heat exchanger and the like.

Other objects and advantages of the invention will become apparent from the following description of embodiments with reference to the accompanying drawings wherein:

FIGS. 5, 6, 7 and 8 are partially enlarged views of honeycomb structures of embodiments of the present invention; and FIG. 9 is a view showing another embodiment of the present invention as a model.

Figure 3:
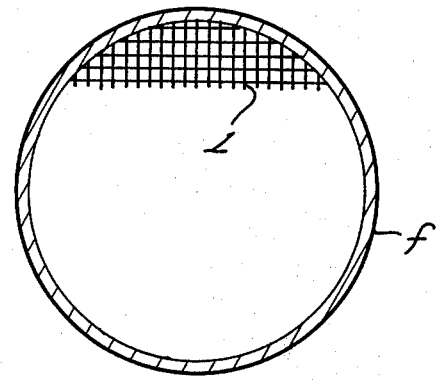
FIG. 3 is a view showing a conventional honeycomb structure of which the outer peripheral portion is reinforced.

According to the present invention, by making the wall thickness of at least one part of the open passages formed in an annular portion along an outer periphery of a ceramic honeycomb structure larger than that of the other open passages, preferably for two or three rows or more, the mechanical strength thereof can be remarkably improved as compared with a conventional structure in which the open passages are defined by walls of a uniform thickness. Also according to the present invention, a rough surface having projections is formed in an outer periphery of the structure to operate as a radiation fin. Therefore, the thermal shock strength of the structure can also be improved as compared with the conventional structure in which the outer peripheral portion is formed into a smooth thick wall portion as shown in FIG. 3.

Figure 5:
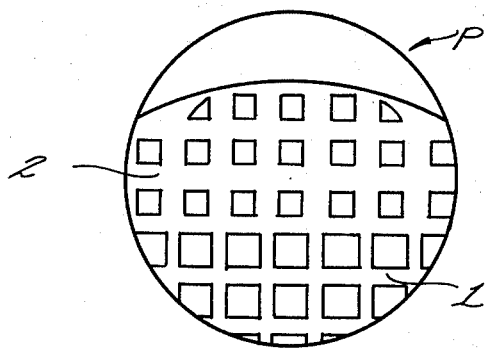

Embodiments of the present invention are grouped as follows. Namely, according to the first group, the wall thickness of the outer peripheral portion is made larger than that of the other portion uniformly for one or several rows as shown in FIG. 5 and FIG. 6. According to the second group, the wall thickness of the structure is increased in the outer peripheral portion by stages as shown in FIG. 7 or continuously as shown in FIG. 8.

According to the third group, a honeycomb structure having open passages of a regular square shaped cross section is formed by making the wall thickness of the open passages positioned in the weak strength directions of the structure, for example, in diagonal directions of open passages thereof, larger than that of the other open passages in the other portion as shown in FIG. 9.

Figure 1:
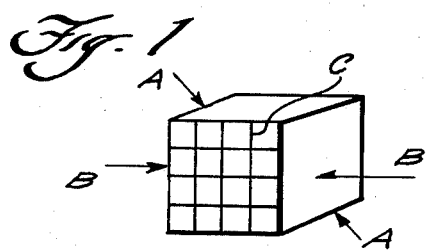
FIG. 1 is a view showing a unit section of a honeycomb structure as a model.
Figure 2:
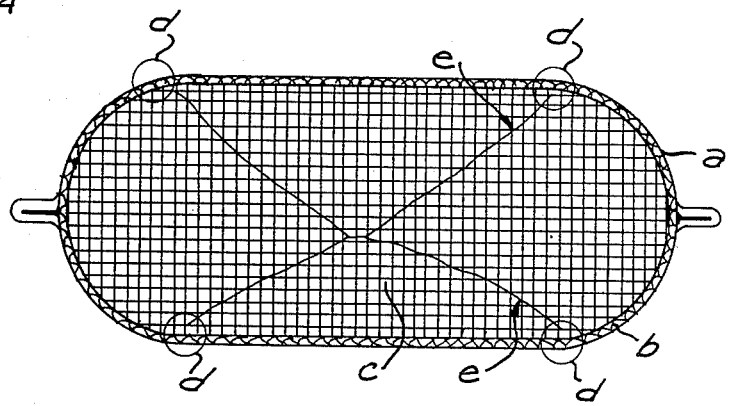
FIG. 2 is a view showing one example of a case in which an elliptical honeycomb structure is accommodated.

Furthermore, when the honeycomb structure is attached within a case as shown in FIG. 2, the wall thickness of only the corner portions d is made larger than that of the other portions. When the outer peripheral surface of the structure is formed into a rough surface having projections and the wall thickness of the open passages of the outer peripheral portion is made large as shown in FIGS. 6 to 8, the thermal shock strength can be effectively improved as well as the mechanical strength.

The rough surface having projections can be formed in the outer peripheral surface of the honeycomb structure in an axial direction by using an extrusion die which has a roughened forming surface.

When the honeycomb structure with the roughened outer peripheral surface having projections is heated, the temperature of the outer peripheral portion and that of the other portions become approximately equal to each other due to the heat radiation effect of the outer peripheral portion. This is true even if the wall thickness of the outer peripheral portion is made larger than that of the other portion.

As described above, such a honeycomb structure provided with a roughened outer peripheral surface has a high thermal shock strength as compared with the other structure.

Hereinafter, several embodiments of the present invention will be explained. In the following embodiments, honeycomb structures having a plurality of open passages of a regular square cross section were formed by mixing material composed of 70% by weight of cordierite powder, 20% by weight of water and 10% by weight of an organic binder, and then extrusion-molding the mixture and firing the extruded material after drying.

Embodiment 1

Figure 4:
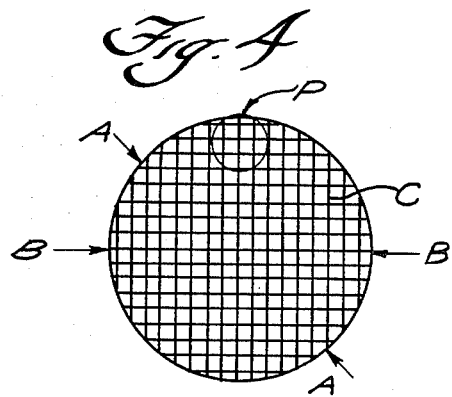
FIG. 4 is a view showing a circular honeycomb structure as a model.

A ceramic structure having a circular cross section, an outer diameter of 117 mm, an axial length of 75 mm and 300 open passages per square inch of cross sectional area as shown in FIG. 6 was formed by making the wall thicknesses of open passages in the outer peripheral portion 2 larger than the other portion for three rows of open passages. The enlarged view of the portion P of FIG. 4 is shown in FIG. 5. Namely, the wall thickness of the outer peripheral portion 2 was 0.7 mm and that of the other portion was 0.3 mm. (Sample No. 1)

Embodiment 2

A ceramic structure having the same shape, size and number of open passages as those of Embodiment 1 was formed by making the wall thickness of open passages in the outer peripheral portion 2 larger than the other portion 1 for three rows of open passages, namely 0.7 mm, and a roughened surface having projections was formed in the outer periphery in the extrusion molding step. The enlarged view of one portion P of the ceramic structure obtained is shown in FIG. 6. (Sample No. 2)

Embodiment 3

A ceramic structure having the same shape, size and number of open passages as those of Embodiment 1 was formed by making the wall thickness of the first three rows 3 of the open passages of the outer peripheral portion largest and making that of the next three rows 4 of open passages smaller than that of the first three rows and larger than that of the other portion 1. Also, in the extrusion molding step, a roughened surface having projections was formed in the outer periphery of the structure. The enlarged view of one portion P of the ceramic structure obtained is shown in FIG. 7. The wall thickness of three ceramic structures (Sample No. 3-1, 3-2, and 3-3) formed by such a method as described above is shown in the following table.

TABLE 1

| Sample No. | the most outer peripheral portion | inside of the most outer peripheral portion |
|---|---|---|
| 3-1 | 0.5 mm | 0.4 mm |
| 3-2 | 0.7 | 0.5 |
| 3-3 | 0.9 | 0.6 |

Embodiment 4

A ceramic structure having the same shape, size and number of open passages as those of Embodiment 1 was formed by continuously increasing the wall thickness of open passages in the outer peripheral portion 5 for five rows in an outer peripheral direction. The enlarged view of one portion P of the ceramic structure obtained is shown in FIG. 8.

Thus, two ceramic structures having wall thicknesses of 0.5 mm in the most outer peripheral portion (Sample No. 4-1) and 0.7 mm (Sample No. 4-2) were formed. In the outer periphery of each of the structures, a roughened surface 6 having projections was formed.

Embodiment 5

A ceramic structure having the same shape, size and number of open passages as those of Embodiment 1 was formed by making the wall thicknesses of the open passages 5 positioned along diagonal lines of the regular square passages of the structure c for a width of 20 mm, thicker than that of the other open passages of the other portion, i.e. 0.6 mm thick. A roughened surface having projections was also formed in the outer periphery of the structure c as shown in FIG. 9. (Sample No. 5).

The mechanical strength and the thermal shock strength of Sample No. 1 to No. 5 in directions of A and B were measured. The mechanical strength was measured by pressing the samples between plane plates placed on the upper and lower sides thereof by means of Amsler's universal material testing machine.

The thermal shock strength was measured by repeating the cycle of holding the samples within an electric furnace at 800° C. for 30 minutes and cooling them in air for one hour until each of the samples was completely cracked.

The results of the measurement are shown in Table 2 together with the results of the measurement on conventional structures.

The conventional structure 1 which was tested had a size and a shape equal to those of the structures of the present invention and the wall thicknesses of the open passages was 0.3 mm. Another conventional structure 2 was formed by forming a main body of which the outer diameter was smaller than that of the structures of Embodiments 1 to 5 by 3 mm, and the wall thickness was 0.3 mm. A slurry having the same composition as that of the main body was applied to a thickness of 3 mm to an outer periphery thereof, and the structure was fired after drying as shown in FIG. 3.

TABLE 2

| No. | | 1 | 2 | 3-1 | 3-2 | 3-3 | 4-1 | 4-2 | 5 | Conventional Structure 1 | 2 |
|---|---|---|---|---|---|---|---|---|---|---|---|
| Property | | | | | | | | | | | |
| Mechanical | direction A | 400 | 360 | 380 | 420 | 480 | 380 | 440 | 400 | 280 | 380 |
| Strength ($K_g$) | direction B | 1200 | 950 | 1100 | 1450 | 1700 | 1200 | 1500 | 840 | 800 | 1200 |
| Thermal Shock Strength (time) | | 11~12 | 12~13 | 12~13 | 16~18 | 15~16 | 13~14 | 14~16 | 12~13 | 3~5 | 6~11 |

As is apparent from the above results, the ceramic honeycomb structures of the present invention in which wall thicknesses of at least one part of the outer peripheral portion is formed larger than that of the other portion have a remarkably excellent mechanical strength and thermal shock strength as compared with those of the conventional structure 1. Particularly, the mechanical strength in a direction of A is remarkably improved.

Although the mechanical strength of ceramic honeycomb structures of the present invention is approximately equal to that of the conventional structure 2, the thermal shock strength thereof is superior to that of the conventional structure 2. Particularly, the thermal shock strength of the structures having a roughened surface having projections on the outer periphery thereof is superior to that of the conventional structures.

On each of Sample No. 4-2 and the conventional structures 1 and 2, an engine experiment was performed under the following conditions by attaching each of these structures to a case.

(1) engine . . . 2000 cc, 4 cycle
(2) conditions . . . cyclically operated at an entrance temperature of the honeycomb structure of 850° C. for 10 minutes and at 100° C. for 10 minutes
(3) applied vibration . . . vibration of 10 G–14.4 Hz was applied by a vibrating machine to which the case was attached.

As a result, in the conventional structure 1, cracks occurred in the outer periphery thereof at the 45th operation cycle, and in the conventional structure 2, cracks occurred in a boundary portion between the thick-walled covered portion and the outer periphery of the main body of the 200th operation cycle. In contrast, in the structure of the present invention, no abnormal phenomena could be recognized even at the 200th operation cycle.

Embodiment 6

An elliptical structure having an elliptical cross section, a long diameter of 170 mm, a short diameter of 81 mm, an axial length of 143 mm, and 300 open passages per square inch of cross sectional area was formed by continuously increasing the wall thickness of open passages for five rows in each of the corner portions toward the outer periphery thereof to 0.7 mm thick. Also, a roughened surface having projections was formed in the outer periphery thereof. Then, an engine experiment similar to that performed on Sample No. 4-2 and the conventional structures 1 and 2 was performed by attaching this elliptical structure to a case as shown in FIG. 2.

Also, a similar experiment was performed upon a conventional elliptical structure having a uniform wall thickness of 0.3 mm. As a result, in a conventional structure, cracks occurred at the 500th operation cycle. In contrast, in the structure of the present invention, no abnormal phenomena could be recognized even at the 200th operation cycle.

Having now fully described the invention, it will be apparent to one of ordinary skill in the art that many changes and modificatiins can be made thereto without departing from the spirit or scope of the invention as set forth herein.

What is claimed is:

1. In a ceramic honeycomb structure provided with a plurality of open passages extending therethrough in an axial direction thereof and defined by thin walls of said structure the improvement wherein:

the wall thickness of at least one part of walls of said structure which define said open passages formed in an annular portion along an outer peripheral surface of said structure is formed larger than that of the other open passages formed in portions other than said annular portion.

2. A ceramic honeycomb structure according to claim 1 wherein:

said outer peripheral surface of said structure is formed into a roughened surface having projections.

3. A ceramic honeycomb structure according to claim 2, wherein:

the wall thickness of all of said open passages formed in said annular portion is formed larger than that of the other open passages for a predetermined number of rows of open passages along a radial direction of said structure.

4. A ceramic honeycomb structure according to claim 3, wherein:

the wall thickness of all of said open passages formed in said annular portion is increased continuously along a radial direction of said structure toward said outer peripheral surface thereof.

5. A ceramic honeycomb structure according to claim 3, wherein:

the wall thickness of all of said open passages formed in said annular portion is increased by stages along a radial direction of said structure toward said outer peripheral surface thereof.

6. A ceramic honeycomb structure according to claim 2, wherein:

said open passages have a regular square cross section and the wall thickness of said open passages which are positioned along diagonal lines passing through the center of said structure in said annular portion and said other portions is formed larger than that of the other open passages.

* * * * *